Figure 1:
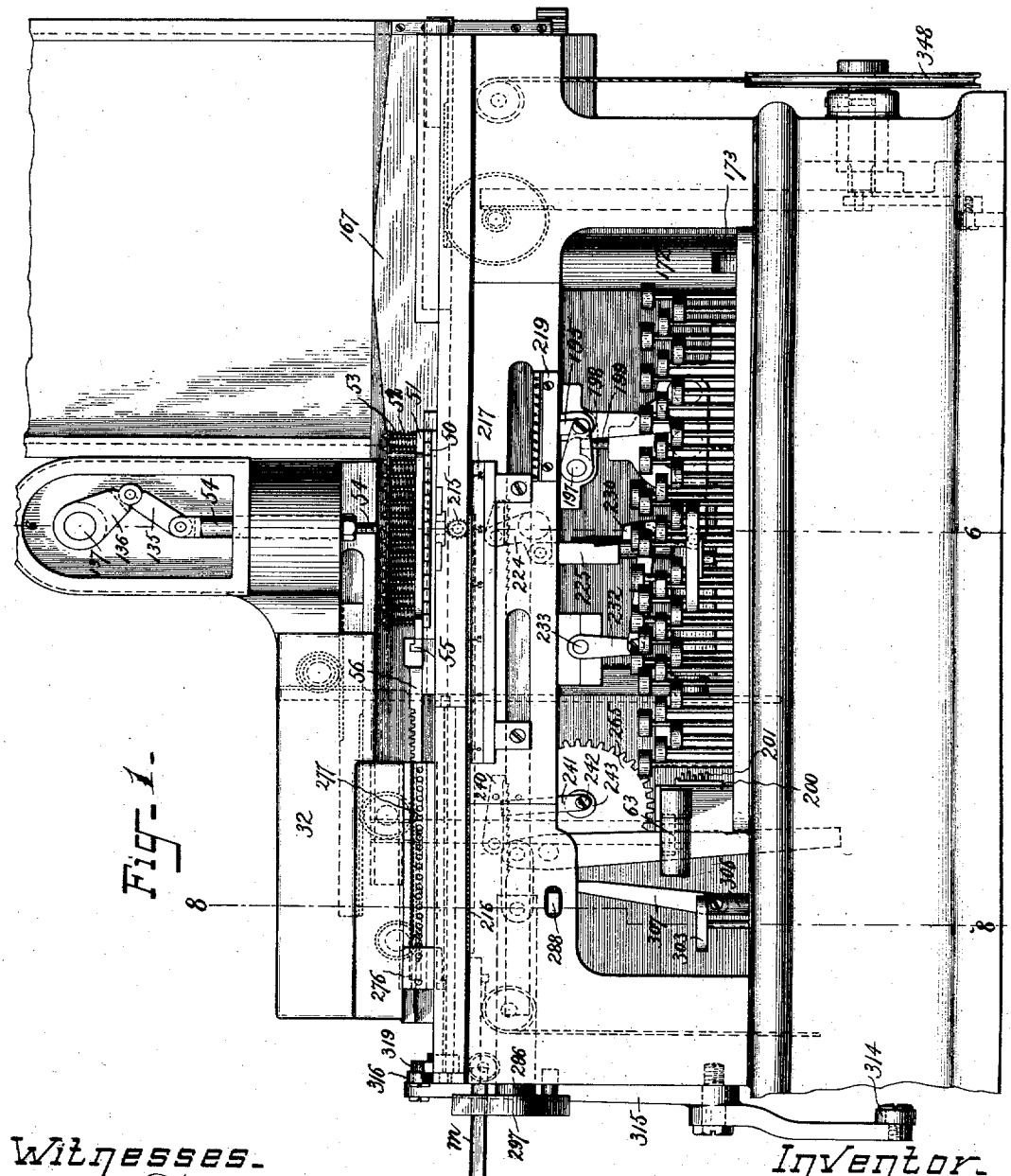

No. 769,168. PATENTED SEPT. 6, 1904.
F. A. JOHNSON.
MACHINE FOR MANUFACTURING JUSTIFIED LINE MATRICES.
APPLICATION FILED OCT. 24, 1899.
NO MODEL. 13 SHEETS—SHEET 1.

No. 769,168. PATENTED SEPT. 6, 1904.
F. A. JOHNSON.
MACHINE FOR MANUFACTURING JUSTIFIED LINE MATRICES.
APPLICATION FILED OCT. 24, 1899.
NO MODEL. 13 SHEETS—SHEET 2.

No. 769,168. PATENTED SEPT. 6, 1904.
F. A. JOHNSON.
MACHINE FOR MANUFACTURING JUSTIFIED LINE MATRICES.
APPLICATION FILED OCT. 24, 1899.
NO MODEL. 13 SHEETS—SHEET 4.

Witnesses.
John F Nelson
E W Clement

Inventor
F Amos Johnson
By F S Watson, att.

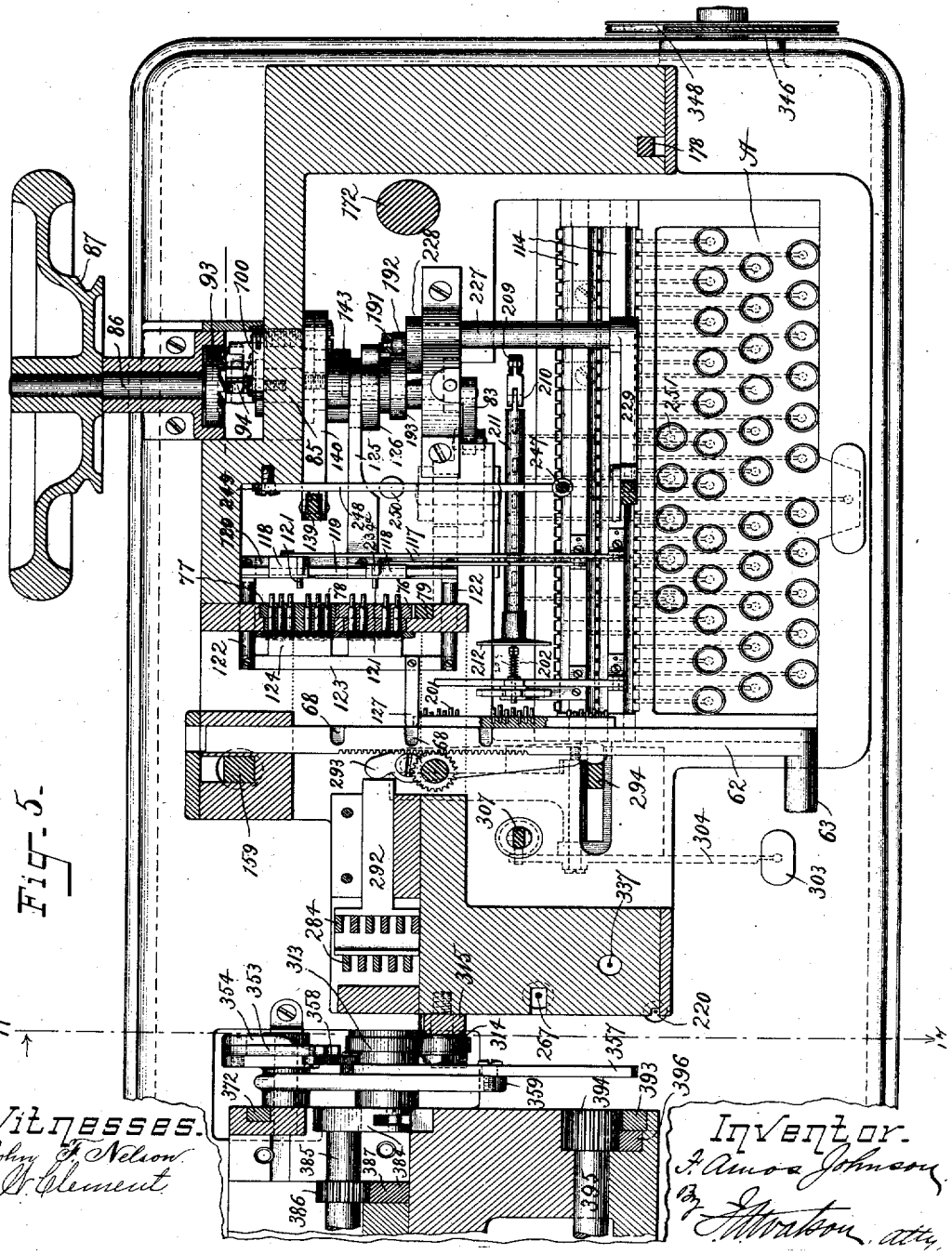

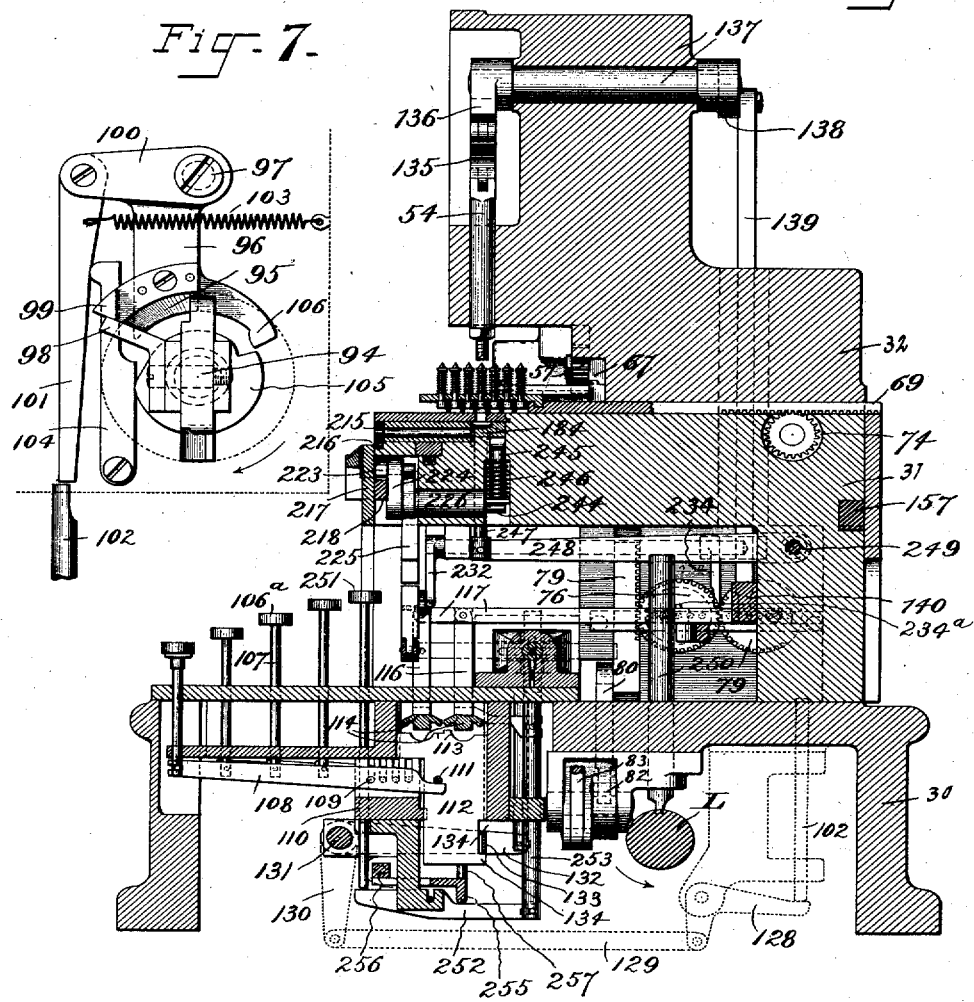

No. 769,168. PATENTED SEPT. 6, 1904.
F. A. JOHNSON.
MACHINE FOR MANUFACTURING JUSTIFIED LINE MATRICES.
APPLICATION FILED OCT. 24, 1899.
NO MODEL. 13 SHEETS—SHEET 7.
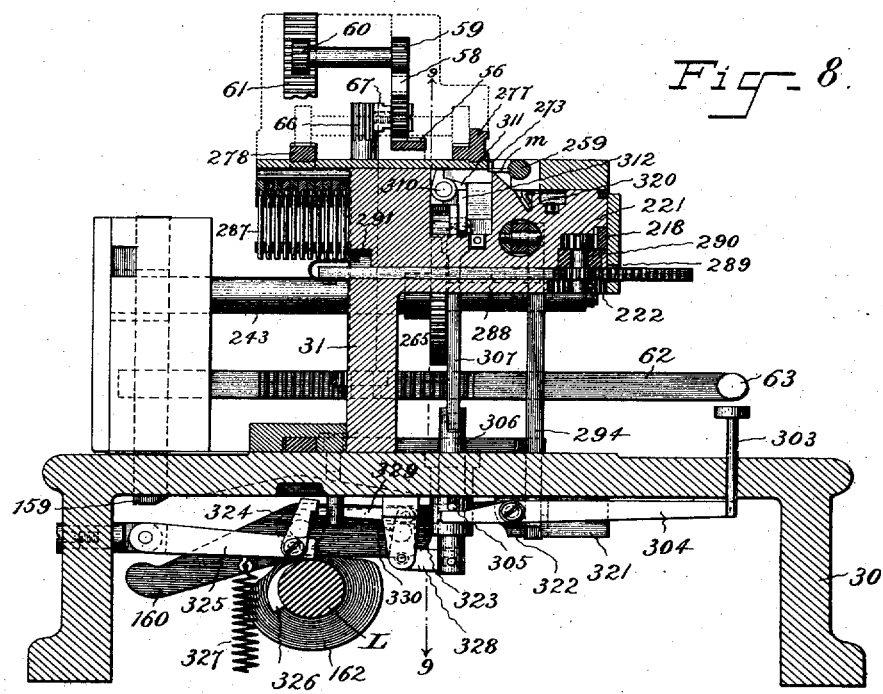
Fig. 8.
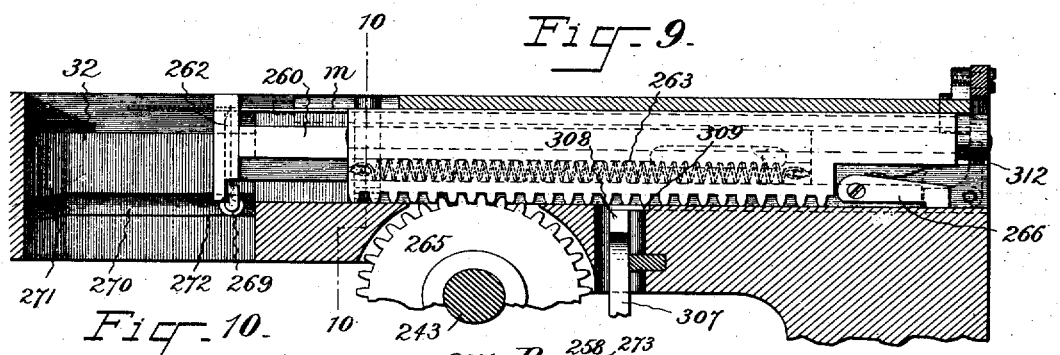
Fig. 9.
Fig. 10.
Witnesses.
John F. Nelson
C. W. Clement
Inventor.
F. Amos Johnson
By J. H. Watson, Atty.

No. 769,168. PATENTED SEPT. 6, 1904.
F. A. JOHNSON.
MACHINE FOR MANUFACTURING JUSTIFIED LINE MATRICES.
APPLICATION FILED OCT. 24, 1899.
NO MODEL. 13 SHEETS—SHEET 10.

Witnesses
John F. Nelson
C. N. Clement

Inventor
F. Amos Johnson
By F. Winton atty.

No. 769,168. PATENTED SEPT. 6, 1904.
F. A. JOHNSON.
MACHINE FOR MANUFACTURING JUSTIFIED LINE MATRICES.
APPLICATION FILED OCT. 24, 1899.
NO MODEL. 13 SHEETS—SHEET 11.
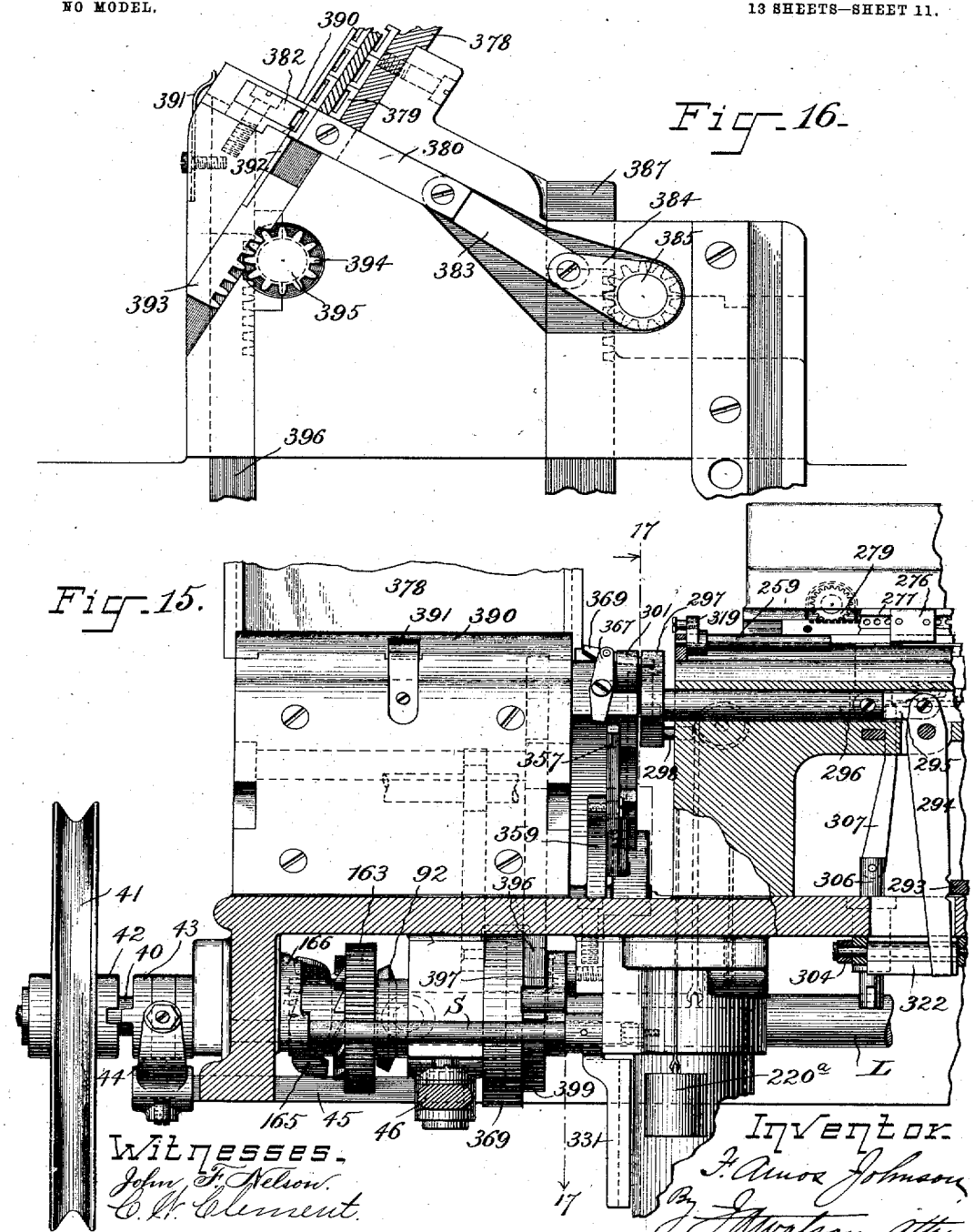

No. 769,168. PATENTED SEPT. 6, 1904.
F. A. JOHNSON.
MACHINE FOR MANUFACTURING JUSTIFIED LINE MATRICES.
APPLICATION FILED OCT. 24, 1899.
NO MODEL. 13 SHEETS—SHEET 12.
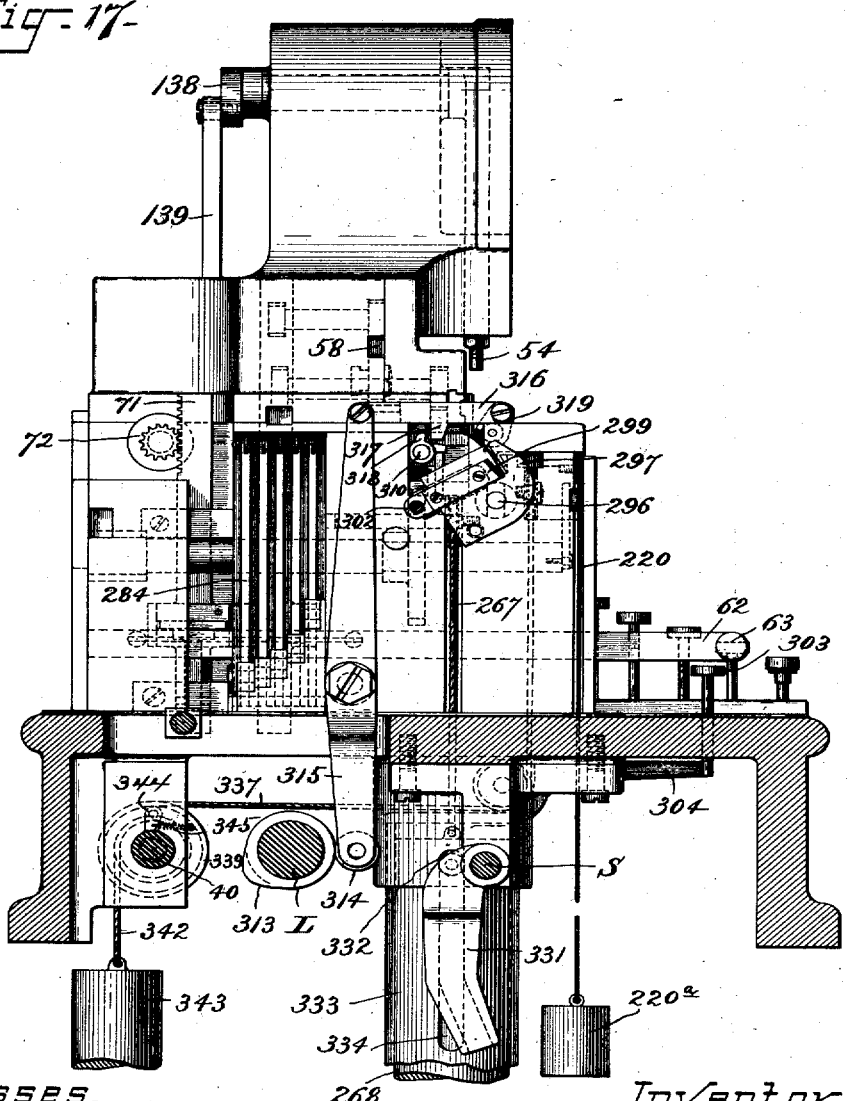

No. 769,168. PATENTED SEPT. 6, 1904.
F. A. JOHNSON.
MACHINE FOR MANUFACTURING JUSTIFIED LINE MATRICES.
APPLICATION FILED OCT. 24, 1899.
NO MODEL. 13 SHEETS—SHEET 13.
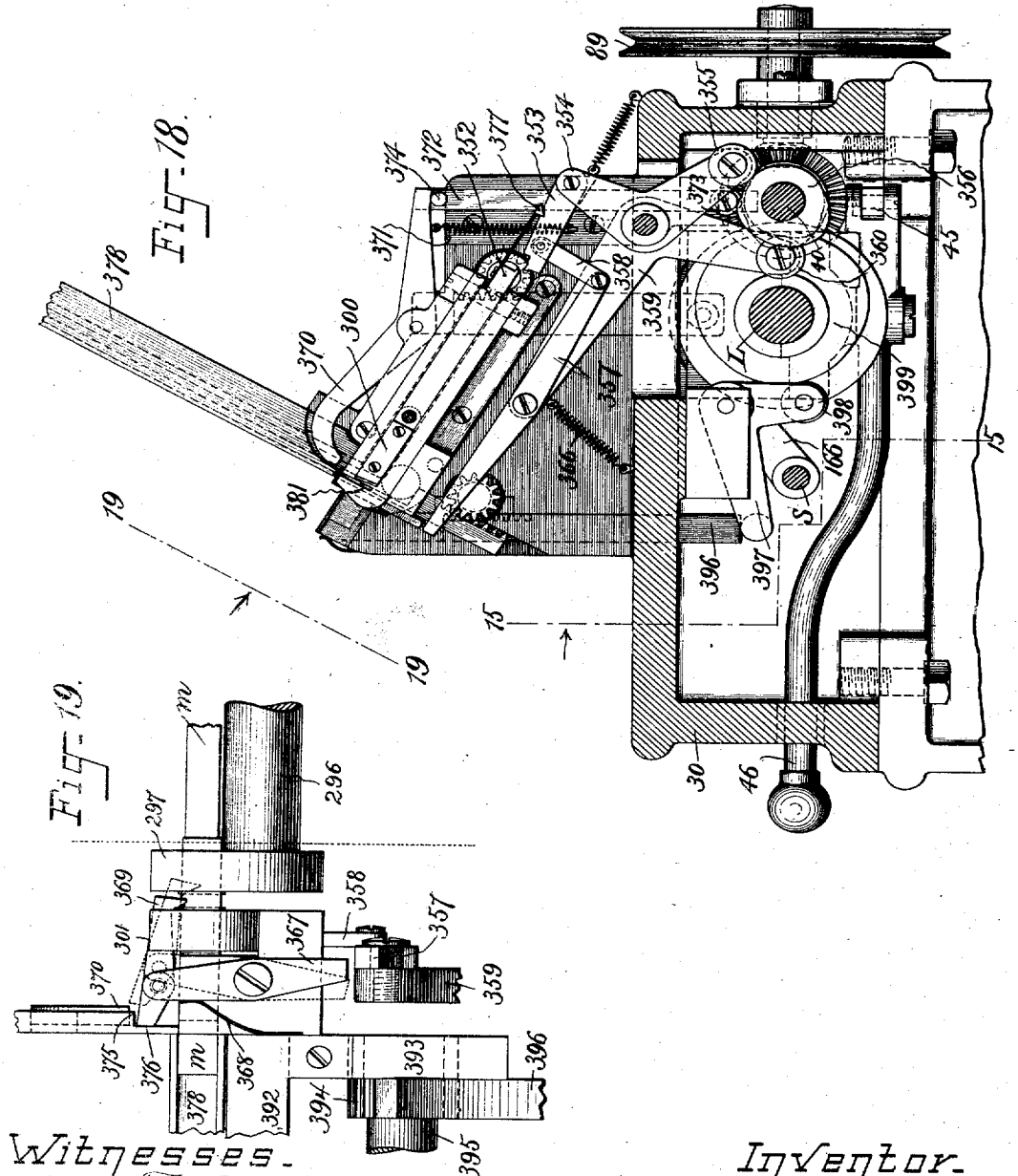

No. 769,168.

Patented September 6, 1904.

UNITED STATES PATENT OFFICE.

FRANK AMOS JOHNSON, OF NEW BEDFORD, MASSACHUSETTS, ASSIGNOR, BY MESNE ASSIGNMENTS, TO THE UNITYPE COMPANY, OF MANCHESTER, CONNECTICUT, A CORPORATION OF CONNECTICUT.

MACHINE FOR MANUFACTURING JUSTIFIED-LINE MATRICES.

SPECIFICATION forming part of Letters Patent No. 769,168, dated September 6, 1904.

Application filed October 24, 1899. Serial No. 734,645. (No model.)

*To all whom it may concern:*

Be it known that I, FRANK AMOS JOHNSON, a citizen of the United States, residing at New Bedford, in the county of Bristol and State of Massachusetts, have invented certain new and useful Improvements in Machines for Manufacturing Justified-Line Matrices, of which the following is a specification.

The present invention is a machine for manufacturing justified-line matrices from which linotype bars or slugs may be cast in any suitable casting apparatus.

The machine is provided with a magazine for blank strips of matrix material considerably longer than the justified lines to be produced. The material may be of any character suitable for receiving impressions of type-dies—such, for instance, as that shown and described in Letters Patent No. 478,333, dated July 5, 1892. The matrix-strips are ejected successively from the magazine and moved by suitable feeding devices through the impression mechanism. The feeding devices move the strip variably according to the widths of the several letters impressed, and the impressions are made in the strip in response to the keys of a keyboard, the machine being operated like an ordinary typewriter. The spaces between words in the unjustified strip are at least as large as the maximum space allowable between words in a justified line. The impressions start at a uniform distance from the forward end of the strip, and the unused portion of the strip is cut off at a uniform distance in the rear of the last impression. The strips thus formed will vary in length according to the amount of matter and the number of word-spaces in a line, and it remains to justify the strips by cutting out portions between the words sufficient in the aggregate to reduce the strip to the desired length. These portions are cut out, as shown in the present embodiment of the invention, by two reciprocating knives, one of which is adjustable with reference to the other, the adjustment being effected by the justifying mechanism proper.

The justifying mechanism comprises a device for counting the words as the word-space key is operated and a device for measuring the unjustified strip. The word-counting device selects a justifying-lever corresponding to the number of word-spaces in a line, and movement is imparted to said lever by the measuring devices, the said movement bearing a certain relation to the length of the unjustified line. The selected justifying-lever operates certain connections to the carrier for the adjustable justifying-knife, setting said knife in proper relation to the non-adjustable knife, so that the distance between the knife-edges will equal the amount to be cut out of each word-space. The unjustified strip is then moved intermittently past the knives, each word-space being stopped in position to have a piece cut from it. The knives are brought into action as each word-space reaches them by a suitable trigger, which is operated by notches cut in the strip to indicate the location of word-spaces. The said notches are formed in response to the word-space key as the strip is passing the matrix devices. The severed words of a strip will in the aggregate just form a justified line. These words are driven forward into a line-holder after leaving the cutting mechanism. The words of each line are swaged into a separate holder. The assembled words in a line-holder form a perfect line-matrix from which a linotype-slug may be cast. The holders of course may be used repeatedly, the matrix material being separated from them after casting the linotype-slugs.

The operation of the entire machine is automatic. The impression devices are controlled by a keyboard similar to the keyboard of a type-writer. A shift-key is used for bringing the small letters, caps, and figures into action, as may be desired. A space-key is provided for the word-spaces, and a "line-key" is provided for starting the justifying devices when sufficient matter has been impressed in the strip to form a line. The impression and feeding devices are operated by an escape-shaft which makes one revolution for each letter, the measuring and justifying devices proper are operated by a movement-shaft which makes one revolution for each line, and the cutting devices are operated from a constantly-running shaft and at such speed that the impressed line is justified more rapidly than the succeeding line can be impressed. The keyboard can therefore be operated continuously, the only delay necessary between lines being the time required to touch the line-key.

An embodiment of the invention will now be described in detail, reference being had to the accompanying drawings, in which—

Figure 2:
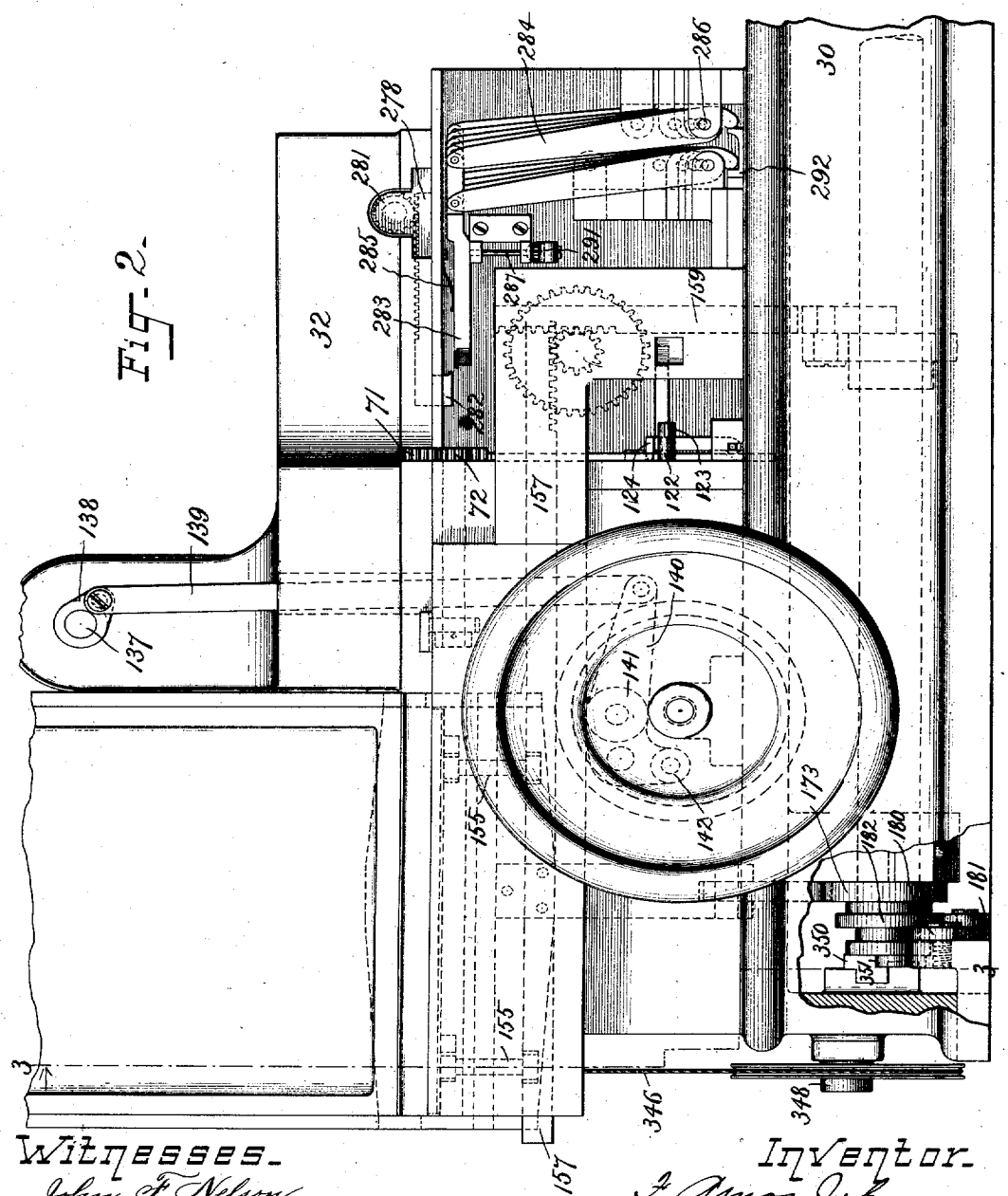
Figure 3:
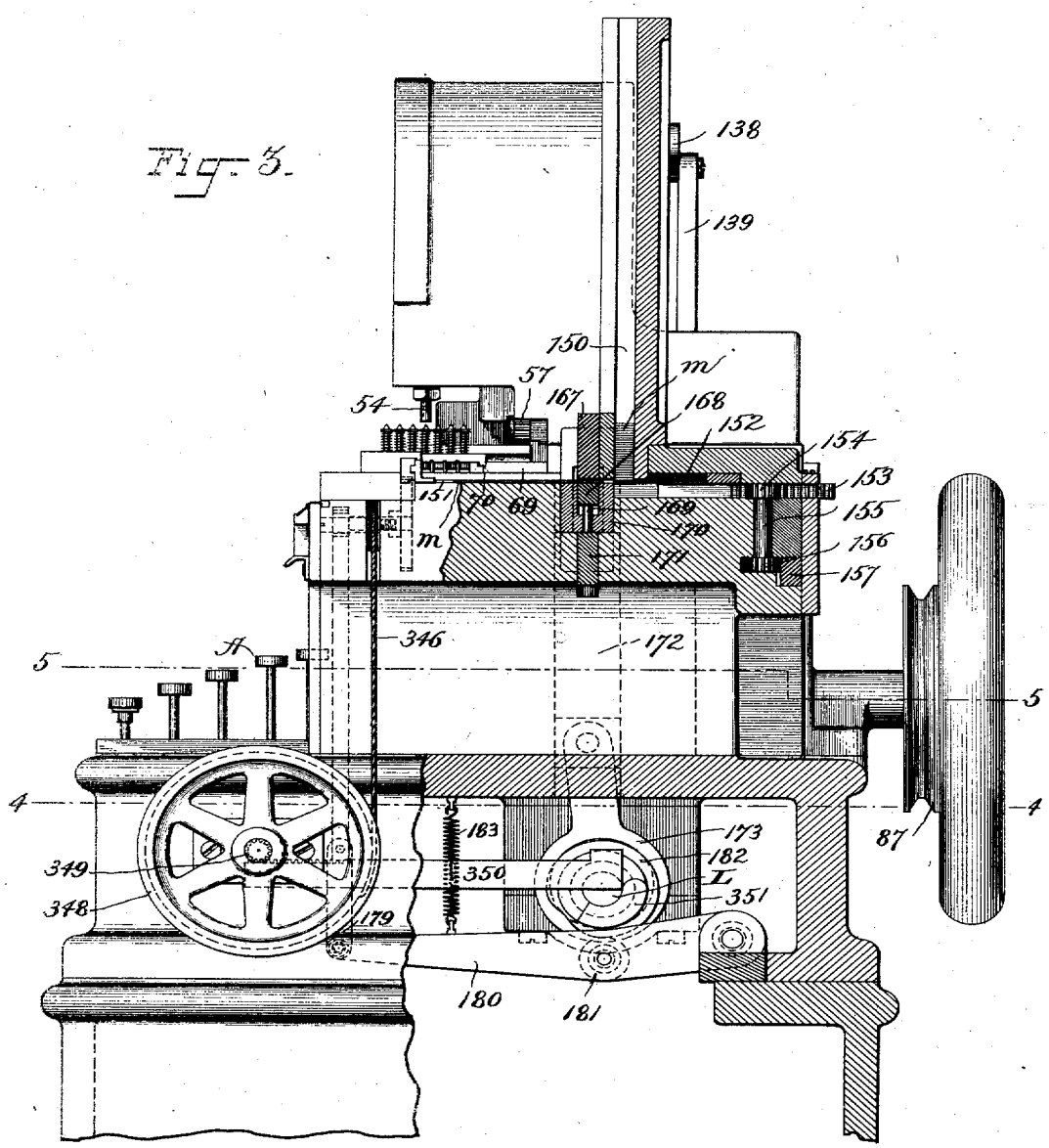
Figure 4:
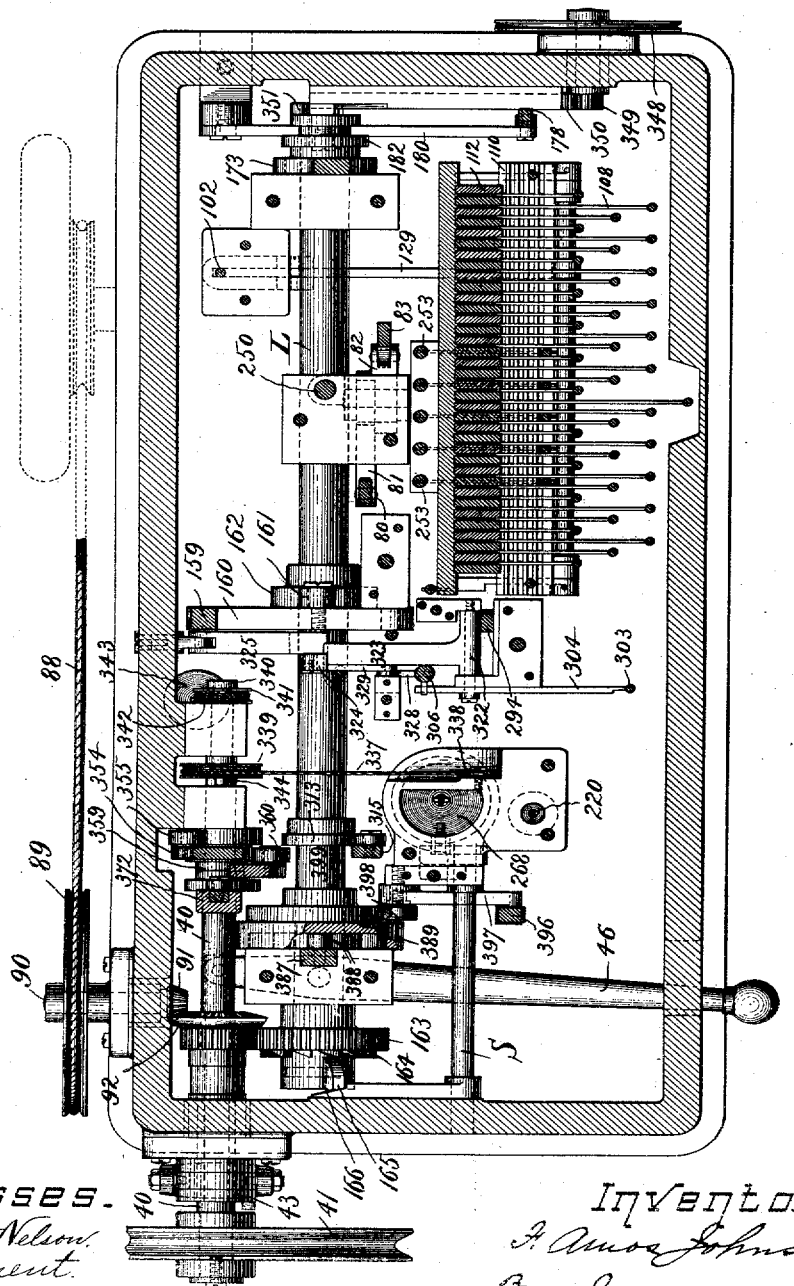
Figure 11:
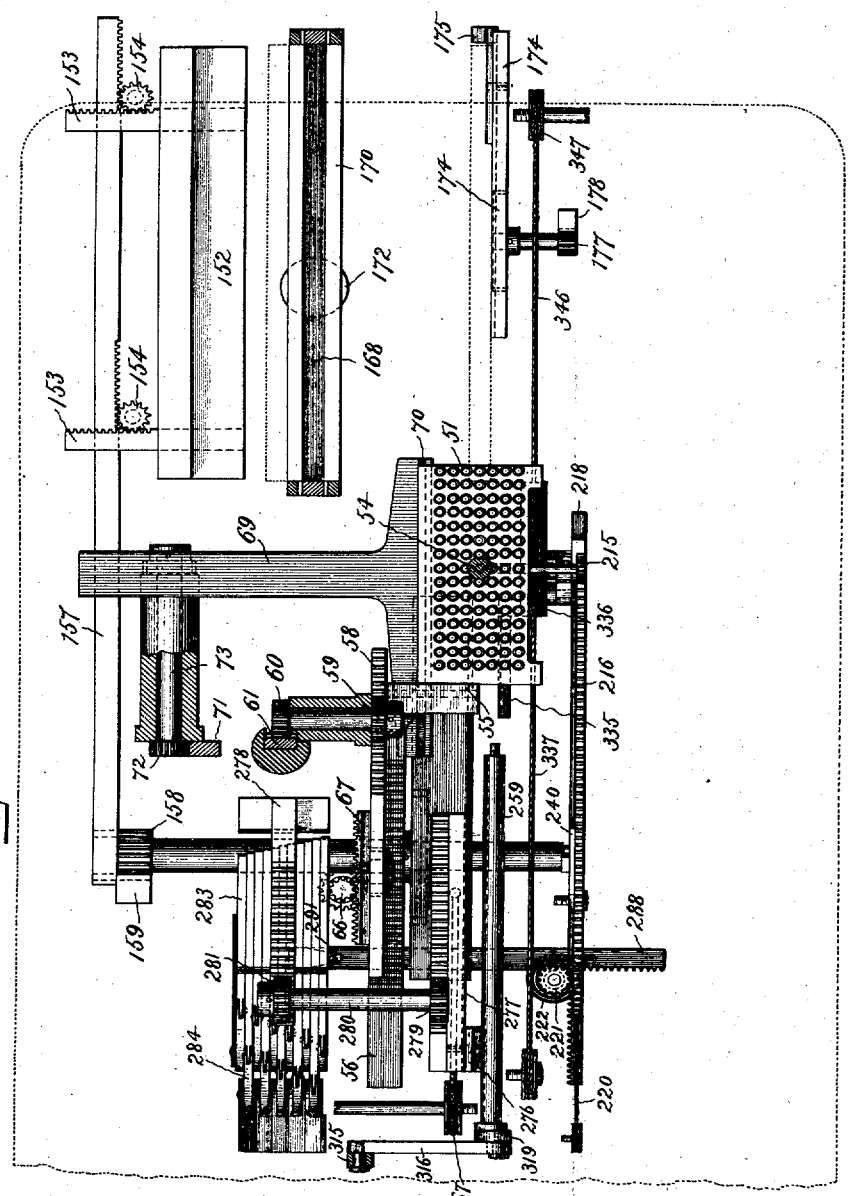
Figure 12:
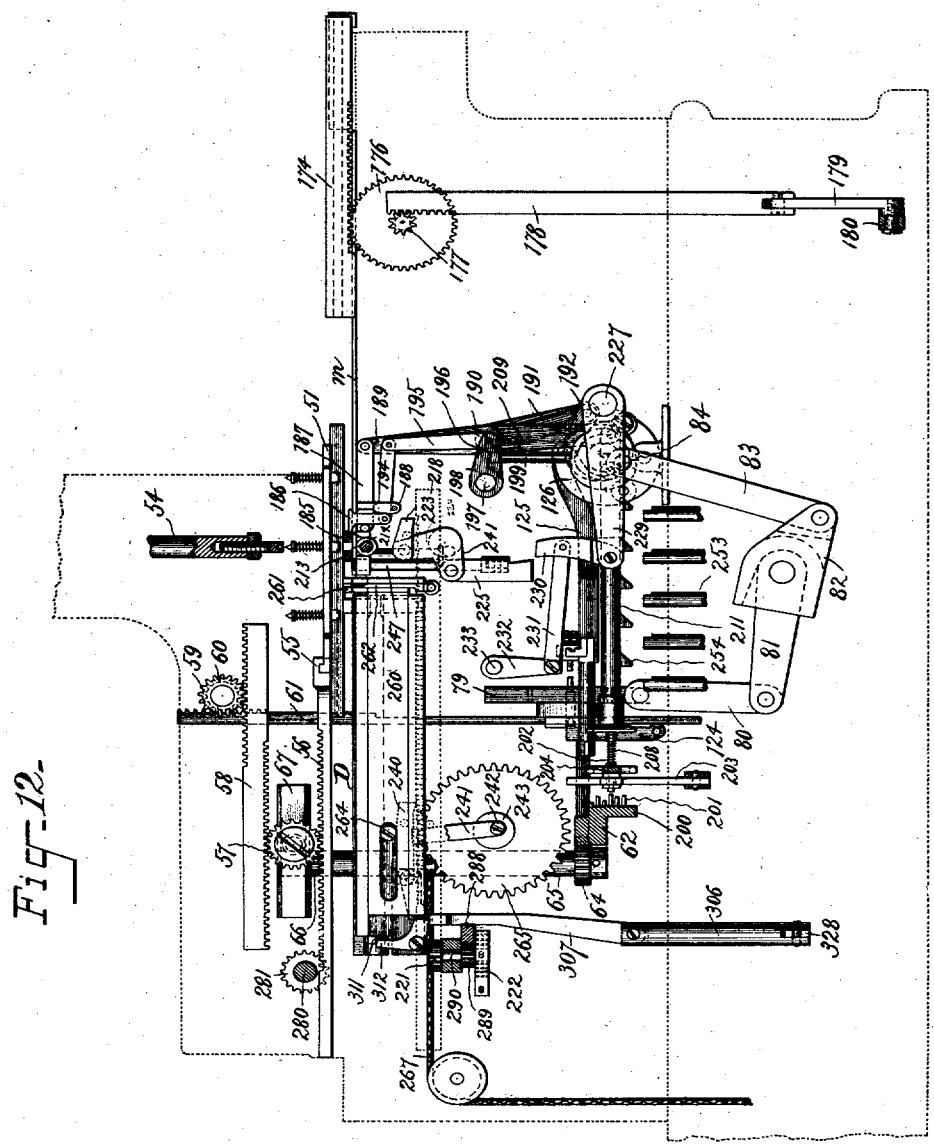
Figure 13:
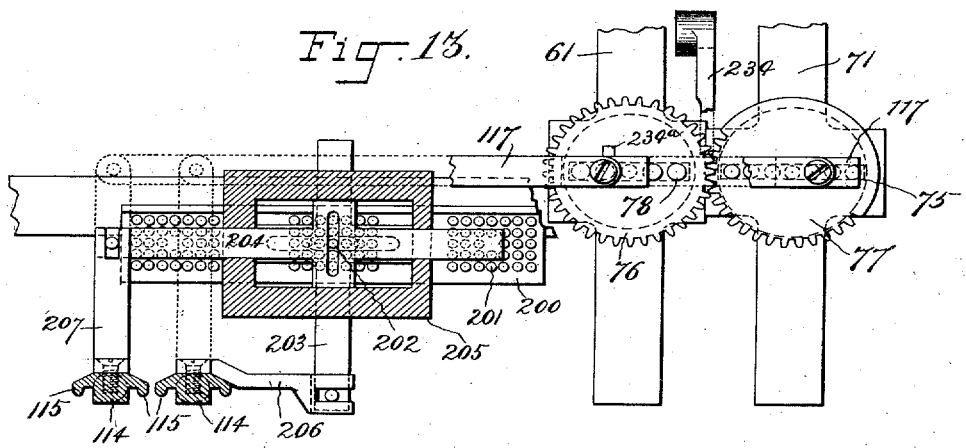
Figure 14:
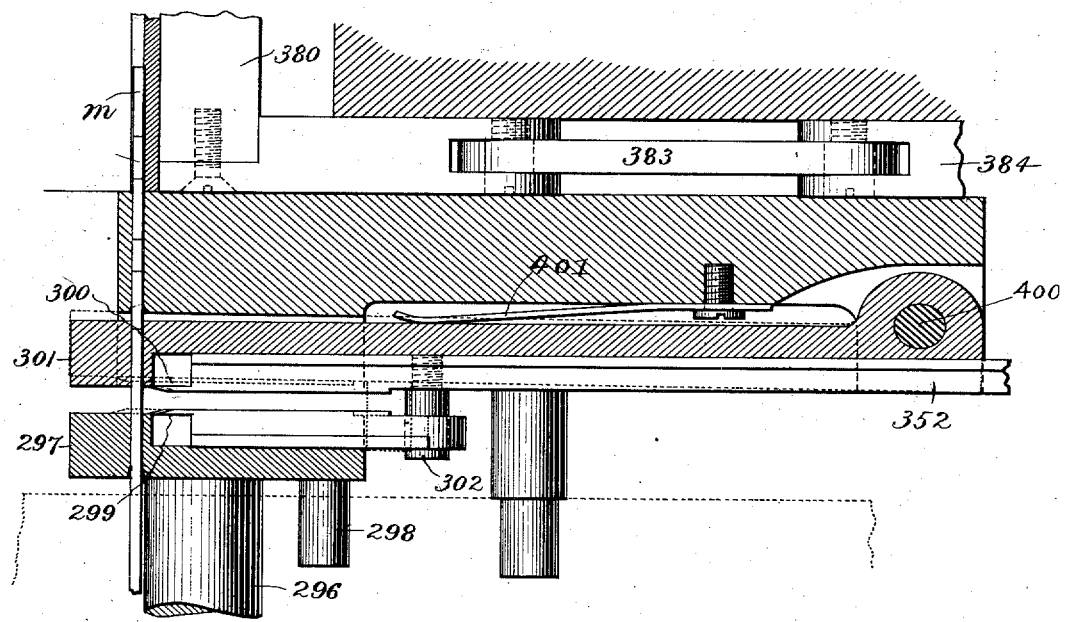

Figure 1 is a front elevation of the right-hand portion of the machine. Fig. 2 is a rear elevation of the same, part of the base being broken away. Fig. 3 is an elevation of the left end, partly in section, on the line 3 of Fig. 2. Fig. 4 is a horizontal section of the entire machine on the line 4 of Fig. 3. Fig. 5 is a similar view of the right-hand portion of the machine, taken on the line 5 of Fig. 3. Fig. 6 is a vertical section on the line 6 of Fig. 1. Fig. 7 is a detail of the escape-shaft clutch. Fig. 8 is a section on line 8 of Fig. 1. Fig. 9 is a partial section on the line 9 of Fig. 8. Fig. 10 is a section on the line 10 of Fig. 9. Fig. 11 is a skeleton plan view showing the die-shifting mechanism, counting and measuring racks, and other movable parts of the machine. Fig. 12 is a skeleton view showing a number of movable parts in front elevation. Fig. 13 shows in detail part of the die-centering and variable-feed devices. Fig. 14 is a sectional view showing the knives or chisels for removing portions of the matrix-strip between words. Fig. 15 is a front elevation of the left end of the machine, partly in section, on the line 15 of Fig. 18. Fig. 16 is a detail of the matrix-assembling mechanism viewed from the line 17 of Fig. 15. Fig. 17 is a left end elevation, partly in section, on the line 17 of Figs. 5 and 15. Fig. 18 is a section on the line 17 of Figs. 5 and 15 looking to the left, and Fig. 19 is a view looking toward the line 19 of Fig. 18.

The various operating parts of the machine are mounted on a suitable framework. As shown, this consists of a base 30, a longitudinal bracket 31, and a cap-piece or bracket 32. The mechanism is driven by a power-shaft 40, on which is a continuously-rotating pulley 41, having a clutch member 42, adapted to engage with a second clutch member 43, which slides upon and turns with the shaft. The clutch member 43 is controlled by a yoke 44, slide 45, and lever 46. The machine can be stopped and started by moving the lever 46, Figs. 15 and 18. The several auxiliary shafts will be mentioned in connection with the devices which they operate.

*Die-centering mechanism.*—The dies 50 are connected to a die-plate 51, having shanks 52, which extend through said die-plate, and springs 53, surrounding the shanks, which normally hold the dies in their elevated positions. The upper ends of the shanks are preferably tapered to fit a corresponding recess in the impression-plunger 54. The die-plate is detachably connected at 55 with a rack 56, by means of which it is moved to the right and left, or longitudinally, Figs. 1, 11, and 12. The rack 56 is reciprocated by means of pinion 57, rack 58, pinions 59 and 60, and vertical rack 61, to which movement is imparted in a manner to be presently described.

The die-plate is divided into several sections or groups, each containing a set of dies of different style or character. For instance, the die-plate shown in Fig. 11 contains three groups of dies, each group being composed of five rows of seven dies, or thirty-five dies. The middle group may, for instance, be small letters, the left-hand group capitals, and the right-hand group figures and punctuation-marks. Any group of dies can be thrown into action instantly, and when in action the groups are all operated alike and automatically by the die-centering mechanism. Fig. 12 shows the impression-plunger 54 and the central die of each of the three groups. The group-shifting mechanism is operated by the slide or shift bar 62, having a handle 63, Figs. 5, 11, and 12. Slide 62 is connected to rack 56 through the medium of pinion 64, shaft 65, pinion 66, cut on the upper end of said shaft, and rack 67, which carries the pinion 57, in mesh with rack 58. It will be evident that if the slide 62 be moved forward or backward while the rack 58 is stationary it will have the effect of shifting the rack 56 and the die-plate 51. On the other hand, when the slide 62 is stationary the die-plate will be shifted longitudinally by means of the vertical rack 61, as heretofore described. The slide or shift bar 62 has three notches 68 cut in it for a purpose to be presently explained. The die-plate is moved laterally by reason of engagement with the rack 69, upon which it is free to move longitudinally. Rack 69 and the plate are interlocked at 70, as shown in Figs. 3, 6, and 11. The rack 69 is reciprocated by vertical rack 71, pinion 72, rock-shaft 73, and pinion 74. The middle die of each group normally stands at the impression-point under the plunger when the group is rendered operative by the shift-bar 62. Any other die of a group may be brought to the impression-point by movement of the die-plate laterally or longitudinally, or both ways simultaneously. The shifting of the die-plate is controlled from the keyboard and effected by mechanism which will now be described. Vertical racks 61 71 are provided with wide portions in which are formed transverse slots 75, Fig. 13. Opposite these slots are two rocking pin-carriers 76 77, each having a number of pins 78, adapted to be projected into the slots 75 and to operate as crank-pins to raise or lower the racks 61 71, Figs. 5, 6, and 13. The pins are arranged symmetrically on opposite sides of the pin-carriers, and their number depends upon the number of rows of dies in each group of the die-carrier, the number of pins being one less than the number of dies in a row. Thus the pin-carrier 77 has six pins for selecting dies from the rows of seven, and the pin-carrier 76 has four pins for selecting dies from the rows of five, the middle rows of a group requiring no corresponding pins in the pin-carriers. The pin-carriers are in the form of gears which intermesh, and they are rocked a quarter of a revolution for each die selected by means of a rack 79, Figs. 6 and 12, link 80, two-part lever 81 82, connecting-rod 83, and crank-pin 84 on the end of the escape-shaft 85, Figs. 5 and 12.

The escape-shaft 85 makes one revolution each time a key of the key-lever is depressed. In line with the escape-shaft is a running-shaft 86, driven by a sheave 87, cord 88, sheave 89, shaft 90, pinion 91, and bevel-gear 92 on the power-shaft 40, Fig. 4. On the forward end of the shaft 86 is a clutch-disk 93, having teeth on its forward face. Pivoted in the end of the escape-shaft 85 is a pawl-lever 94, one end of which constantly tends under pressure of a spring to engage the teeth of the clutch-disk, Figs. 5 and 7. In the path of the opposite end of the pawl is a cam 95 on an elbow-lever 96, which is pivoted at 97. When the lever 96 is in the position shown in Fig. 7, the pawl 94 is out of engagement with the clutch-disk 93, its tail end resting on the raised end of the cam 95. The escape-shaft is stopped in this position accurately by an arm 98, fixed on said shaft, which engages the stop projection 99 on lever 96. When the lever 96 is rocked by raising its horizontal arm 100, the arm 98 is released from stop 99 and at the same time pawl-lever 94 is released from cam 95. A spring (not shown) immediately throws the pawl into engagement with the clutch-disk and the escape-shaft makes a revolution. The arm 100 of lever 96 is raised by means of a pivoted depending leg 101, the foot of which normally stands over a slide or bolt 102, to be referred to hereinafter. Part 101 is drawn toward the escape-shaft by means of a spring 103. The leg 101 is normally held over the slide 102 by a cam-lever 104 and cam 105. After the escape-shaft has started the cam permits the spring 103 to draw the leg 101 off of the slide 102, after which cam 105, operating on an arm 106, rocks the lever 96 back to its normal position, bringing the parts into position to stop the escape-shaft and throw the pawl out of engagement with the clutch-disk, as shown in Fig. 7.

By means of the connections described the pin-carriers are rocked a quarter-revolution forward and back each time the escape-shaft makes a revolution, and the die corresponding to the selected pins which have been driven into the slots 75 is brought to the impression-point and then returned to its normal position. It is necessary that the die should remain at the impression-point long enough to be driven into the matrix material and returned to its elevated position. This is accomplished by making the lever 81 82 in two parts with a loose joint between them, permitting a certain amount of lost motion on the part 82. This construction is clearly shown in Fig. 12.

The pins of the pin-carriers, and consequently the dies, are selected by means of a keyboard A and connections, which will now be described. Keys 106ª are mounted on stems 107, the lower ends of which are connected to key-levers 108, which have their fulcrums 109 in a channeled block 110. The inner ends of the key-levers engage pins 111 on slides 112, the upper ends of which have bearings or shoulders 113 at various heights. Above the plates 112 are two rock-shafts 114, Figs. 5, 6, and 13. On the front and rear sides of these rock-shafts are ribs or wings 115, having their edges located over the bearing-surfaces 113 of the slides. It will be evident that the bearing-surfaces of any slide may be so located that any degree of rotation may be given to the rock-shafts 114 within certain limits. The rock-shafts have vertical arms 116, the upper ends of which are connected to horizontal links 117, Figs. 5, 6, and 15. The rear ends of the links are connected to blocks 118, which slide upon a guide 119 on a frame 120. The guide 119 is parallel with the normal or horizontal position of the pins in the pin-carriers, and the blocks 118 carry pins 121, which are adapted to be placed in alinement with the pins in the pin-carriers. By properly shaping the bearing-surface of its slide 112 any key may be adapted to place the interponent pins 121 opposite two pins in the pin-carriers, which will effect the selection of a die corresponding to the key.

The frame 120 comprises two bars 122, which slide in openings in the plate in which the pin-carriers are mounted. These bars are connected to the left side of the pin-carriers by a bar 123. Within the bar 123 are the upper ends of two levers 124, adapted to be moved to the right by said bar to return the pins of the pin-carrier after they have performed their work, Figs. 5 and 12. The frame 120 is reciprocated by means of a connecting-rod 125, cam-lever 126, and a suitable cam on the escape-shaft 85, Figs. 5 and 12. The frame 120 is provided with a finger 127, which is adapted to fit accurately within any one of the recesses 68 in the shift-bar. This finger serves to lock the shift-bar and its connected parts while the pin-carriers are being rocked to prevent the rack 58 from shifting the rack 67, upon which the pinion 57 is mounted.

The slide or bolt 102, which starts the escape-shaft, Figs. 4, 6, and 7, is operated by an elbow-lever 128, link 129, arm 130, rock-shaft 131, and arms 132, carrying a universal bar 133, which stands over projections 134 on the slides 112. The universal bar is raised each time any key of the keyboard is depressed, and hence the escape-shaft makes one revolution each time a key is operated.

The operation of the mechanism thus far described will now be briefly recapitulated. Assuming that the shift-bar is set for small letters, which occur in the middle group of the keyboard, a capital letter may be obtained by pushing in the shift-bar and a figure or punctuation-mark by pulling it out, or vice versa. By means of the shift-bar each key of the keyboard is made to select any one of three characters, all of which may be indicated on the key, as is customary in some typewriters. The depression of a key serves to locate the interponents opposite the proper selecting-pins in the pin-carriers. Immediately thereafter the escape-shaft is set in motion and made to move the interponents against the selected pins, driving said pins into the slots in the racks 61 71. A further movement of the escape-shaft rocks the pin-carriers through an arc, which is preferably ninety degrees, each of the racks 61 71 being thereby either raised or lowered, depending on the pin selected to move it. The desired die is thus brought to the impression-point, and it remains there while the plunger descends and rises, owing to the lost motion in the levers 81 82. The pin-carriers are then rocked to their normal positions and the interponent frame moved to the left, the levers 124 restoring the operative pins to their normal position. All of these movements take place very quickly, and immediately after the completion of one rotation of the escape-shaft the next character may be selected and the various movements repeated.

The impression-plunger 64 is adjustable in length by means of a screw and lock-nut, as shown in Fig. 12. It is reciprocated by means of toggle-link 135, toggle-arm 136, rock-shaft 137, arm 138, link 139, and cam-lever 140, said cam-lever having two rolls 141 and 142 bearing on a suitable cam 143 on the escape-shaft, Figs. 1, 2, 5, 6, and 12.

*Matrix-feeding devices.*—The matrix material is preferably supplied to the machine in the form of flat strips, each considerably longer than a justified line. These strips are stored in a magazine 150, Figs. 1, 2, 3, and 11. In line with the bottom of the magazine is a channel or runway 151, through which the strips are moved edgewise from the magazine to the feeding devices proper, as shown clearly in Fig. 3. At each rotation of the line-shaft the bottom strip is shifted from the magazine by the forward movement of an ejecting-blade 152, which movement is accomplished by means of racks 153, pinions 154, rock-shaft 155, pinions 156, rack 157, pinion 158, and vertical rack 159, said rack being reciprocated by a cam-lever 160, having a roll 161, which rests on cam 162 of the line-shaft L. Turning freely on the line-shaft L is a constantly-running gear 163, Fig. 4, on one face of which are a series of teeth 164. Pivoted in the end of the line-shaft is a pawl 165, Figs. 4 and 15, one end of which under pressure of a spring (not shown) tends to engage teeth 164, but is normally held out of engagement by a cam-arm 166, mounted on starting-shaft S. After a line of characters is impressed in the matrix material the starting-lever is rocked by mechanism to be described hereinafter and the cam-arm 166 raised. The pawl 165 being thus freed engages the running-gear 163, and the shaft L is carried around for a complete revolution. Before the revolution is complete the arm 166 is dropped, and the tail end of the pawl 165 engages the cam-arm, withdrawing the pawl from the ratchet-wheel. The line-shaft then remains stationary until the succeeding line of impressions is finished. At each revolution of the line-shaft one strip of matrix material is ejected by the plunger 152. The strip is delivered by said plunger to a straightening device comprising a rigid bar or anvil 167 and a movable bar 168. The movable bar rests on pins 169, which in turn pass through the bottom of a box 170 and rest on a crosshead 171, which is carried by a plunger 172, connected to an eccentric-strap 173, surrounding the line-shaft L. These devices render the strip perfectly straight and ready to receive the impressions of the dies.

The plunger 152 moves the series of strips through the channel 151, bringing the foremost strip into alinement with the impression-plunger and into the path of the initial forwarding device, which moves the strip into engagement with the variable-feed devices. This initial forwarding device comprises a rack 174, having a head 175, which engages the end of the matrix-strip, Figs. 1, 3, 4, 11, and 12. The rack 174 is driven by means of gear 176, pinion 177, vertical rack 178, link 179, and cam-lever 180, having a roll 181 bearing on the under side of cam 182 on the line-shaft, said roll being held in engagement with said cam by a spring 183. In Fig. 12 a strip of the matrix material $m$ is shown in the position to which it was delivered by the rack 174. The forward end of the strip rests upon a slotted anvil 184, directly beneath the impression-plunger 54. Above the anvil 184 is a guide 185 to accurately aline and center the dies. The initial movement of the matrix-strip is limited by a vertically-movable stop 247, Figs. 5, 6, and 12, which is raised and lowered at proper intervals by a lever 248, pivoted at 249 and operated by a slide 250, which rests on a cam formed in line-shaft L. The stop 247 insures the first character of the line being always at the same distance from the forward end of the matrix-strip. After the slide 174 is retracted the stop 147 is withdrawn and the further movements of the matrix-strip are imparted by the variable-feed devices, which will now be described. The matrix-strip passes between the upper jaw 186 and the lower jaw 187 of a friction-feed device. The part 187 slides in a hanger 188, and it is operated by an arm 189 on a rock-shaft 190. A second arm 191 on said rock-shaft carries a roll 192, which is spring-pressed against a cam 193 on the escape-shaft 85, Figs. 5 and 12. The upper jaw 186 is U-shaped, the depending legs of the U being connected to a lever 194, which in turn is connected by link 195 to an arm 196 on the front end of rock-shaft 197. A second arm 198 on said rock-shaft is raised and lowered by a bolt 199, which bears upon one of the cams of the escape-shaft. The lever 194 is mounted in the hanger 188, and when the link 195 is raised the jaw 186 is brought down so as to grip the matrix material. When the material is thus gripped, the pivotal point between the arm 196 and link 195 is in line with the shaft 190 and said shaft may be rocked without disturbing the relation between the jaws 186 and 187. Shaft 190 is rocked to feed the matrix material for each letter and the word-spaces by the cam 193 above described.

It is necessary that the matrix-feed should be variable, differing with the widths of the characters selected. The variable feed is obtained by means of devices now to be described. On the vertical flange or plate 200 on shift-bar 62 are three groups of stop-pins 201, Figs. 5, 12, and 13. The three groups of stop-pins correspond in relative location to the groups of dies in the die-carrier, and the number and arrangement of the stop-pins correspond to the number and arrangement of the dies in the respective groups. The several pins vary in length corresponding to the widths of their respective letters. A stop-plunger 202 is located to the right of the stop-pins 201 and carried by vertical and horizontal slides 203 204, respectively, the slides having slots through which the plunger passes. These slides are suitably guided in a box or frame 205. The vertical slide is adjusted each time a key is depressed by means of an arm 206 on the rear rock-shaft 114, and the horizontal slide is similarly adjusted by an arm 207 on the front rock-shaft 114. It will be evident that the stop-plunger is located by these means similarly to the manner of locating a die beneath the impression-point. The stop-plunger is normally retracted by a spring 208, so as to clear the pins during its adjustment.

Connected to an arm 209 on the shaft 190 by a link 210, Figs. 5 and 12, is a slide 211, having on the left end a rectangular plate 212 of such dimensions that it will engage the stop-plunger 202 in any of its positions.

The operation of the variable-feed devices is as follows: As a die is brought to the impression-point the stop-plunger 202 is simultaneously located opposite the stop-pin, which is adapted to regulate its matrix-feed. The escape-shaft is simultaneously released and the shaft 190 rocked, a spring (not shown) drawing the slide 211 to the left until it is stopped by the stop-plunger and stop-pin. This movement of the rock-shaft 190 carries the matrix-clamp 186 187 to the right a distance equal to the feed required by the selected letter. A further movement of the escape-shaft rocks shaft 197 and causes the clamp to grip the matrix-strip. While the matrix is so gripped the clamps move to the left, feeding the strip the proper distance for the letter selected. For each character and word-space the clamp is loosened, moved back, closed to grip the material, and moved forward the proper distance.

It is sometimes necessary to insert blank spaces of different widths in a line of composition. I provide in the present machine for five widths of spaces in addition to the maximum space previously referred to. To accomplish this, I provide special space-keys 251, here shown arranged in the rear of the keyboard. The stems of these space-keys operate levers 252, the rear ends of which are connected to stop-plungers 253, located directly under the slide 211, Figs. 4, 5, 6, and 12. On the under side of the slide 211 are a series of projections 254, which are adapted to be engaged by any one of the plungers 253 when raised to intercept the slide. In this manner the matrix is fed forward different distances to provide blanks. Overlying the levers 252 is the universal bar 255, which is attached to a rock-shaft 256. The bar 255 through a pin 257 raises one of the slides 112, and thereby trips the escape-shaft. The slide 112 operated does not select a character, and the impression-plunger therefore strikes the central portion of the die-plate.

*Registering devices.*—One edge of the matrix material as it passes under the impression-plunger rests on a knurled wheel 213 and turns said wheel in proportion to the matrix-feed. The wheel 213 is fast on a register-shaft 214, having on its forward end a pinion 215, Figs. 1, 6, 11, and 12, which operates the unit-register rack 216. This rack carries a pointer which indicates its movement on a unit-register scale 217. The scale 217 of the unit-register is carried by a word-register rack 218, which registers the number of word-spaces on a scale 219, Figs. 1, 6, and 12. Each time the word-space key is operated the matrix material is fed forward a distance equal to a maximum word-space and considerably in excess of a normal word-space. In order to indicate the exact amount of matter in the line, it is necessary that the unit-register scale should indicate normal word-spaces, and to effect this while the unit-register rack is moved a maximum space the word-space rack and the attached unit-scale are moved an amount equal to the difference between a maximum space and a normal space. The relative movement, therefore, between the unit-rack and its scale is equal to a normal space each time the word-space key is operated. The unit-register rack is returned to its starting-point after each line by a cord 220, to which a light weight 220ª is attached. The word-space-counting rack is returned to its left-hand or initial position by pinion 221 and a suitable spring 222, Figs. 11 and 12. The space-counting rack is moved to the right by a pawl 223, carried by an elbow-lever 224. On the lower arm of said elbow-lever is a pendent piece 225. The elbow-lever 224 is carried on a rock-shaft 226. A rock-shaft 227, Figs. 5 and 12, has on its rear end an arm 228, resting on a cam located near the forward end of the escape-shaft. On the forward end of the shaft 227 is an arm 229, which carries a pawl 230, which normally plays idly up and down at one side of the leg 225. The pawl 230 is connected by a link 231 to an arm 232 on the forward end of a rock-shaft 233, and on the rear end of said rock-shaft is an arm 234. The arm 234 extends downward near the path of the bar 119, Figs. 5, 6, and 13, and each time a space-key is operated an interponent 234ª, sliding on said bar, is made to register with said arm and rock the same. The space-counting rack is provided with a holding-pawl 240, and at the proper time to return said rack said holding-pawl is raised by a tripping-rod 241, which is connected to an eccentric-pin 242 on the end of the transverse shaft 243, which is rocked by the pinion 158, previously referred to, Figs. 1, 8, 11, and 12.

On the rear end of the shaft 226, Fig. 6, is an eccentric-pin 244, upon which rests a gouge or chisel 245, which is raised to cut a notch in the matrix-strip each time a space-key is operated. This notch or some equivalent mark is necessary to locate the word-spaces in the matrix-strip with reference to the knives of the justifying device, to be hereinafter described. The gouge 245 is retracted by means of a spring 246.

*Justifying mechanism.*—The matrix-strip is fed variably through the impression devices until it has been impressed with sufficient matter to form a line. The amount of matter in the line will be indicated by the unit-register scale. To the left of the impression-point the matrix-strip enters a matrix-carriage D. One edge of the strip is carried on a ledge 258 of the carriage and the other edge slides in a groove in a dump-shaft 259, Figs. 8 and 10. The matrix-carriage has a horizontal slide 260, Figs. 9 and 12, to the right-hand end of which is connected a vertical guideway 261, in which is located a knife 262 for cutting off the unused portion of the matrix-strip immediately in the rear of the last impression. A spring 263 connects the slide 260 with the matrix-carriage and normally tends to throw the slide to its right-hand position. The movement of the slide on the carriage is limited by a pin 264, which passes through a slot in the slide 260, Figs. 9 and 12. Before commencing a new line of matrix the carriage D is returned to its normal or right-hand position, which is shown in Fig. 12, by the gear 265 on shaft 243, which shaft is operated by the vertical rack 159, which also operates the matrix-material ejector, Figs. 2, 8, and 9. The carriage is held in its normal or right-hand position by means of a retaining-pawl 266, and it is constantly impelled toward the left by means of a cord 267 and weight 268. The knife 262 carries at its lower end a roll 269, which runs in a groove 270 in a bracket 32. When the starting-key is touched, the retaining-pawl 266 is raised, as will be hereinafter explained, and the carriage moves to the left. During the first movement of the carriage the knife 262 remains stationary in the position shown in dotted lines in Fig. 9, the spring 263 holding it in said position. When the pin 264 has traveled to the end of the slot in the knife-slide 260, the knife begins to travel along with the carriage and the strip, and during the first movement of the knife-roll 269 in the groove 270 the roll travels up an incline 271 in the groove and drives the knife partly through the strip. The parts are so proportioned that the knife enters the strip a short distance in the rear of the last impression. The strip is only partially severed by this initial movement of the knife, and the parts travel together to the left until roll 269 encounters a second incline 272 in the groove, which causes the knife to completely sever the strip. During this operation the strip is clamped in the carriage by a clamping-finger 273, Figs. 8 and 10, which is carried by a slide or plunger 274, a spring 275 normally drawing the clamp down. While the strip is so clamped in the carriage, the latter is drawn to the left by its weight until the forward end of the strip engages a head 276 on a measuring-rack 277 and carries said rack to the left a distance which is proportional to the difference between the length of the unjustified matrix-strip and a justified line. The matrix-carriage always moves a uniform distance, and it will therefore be evident that the measuring-rack 277 will be moved in accordance with the surplus length in the unjustified matrix-strip.

The measuring-rack 277 is connected with a second measuring-rack 278 by means of pinion 279, shaft 280, and pinion 281. Rack 278 has a cross-head 282, adapted to engage any one of a series of interponent links 283, which are connected to the upper ends of a corresponding series of justifying-levers 284, Figs. 2 and 11. The interponent links 283 are normally held in a plane below the crosshead 282 by springs 285. The levers 284 have their fulcrum-points differently located, so that a given movement of their upper ends would impart different movements to their lower ends. The object of these levers is to divide the surplusage of length in the unjustified matrix-strip by the number of word-spaces in the strip to determine the amount to be removed at each word-space to justify the strip. One of the levers, therefore, has its fulcrum at its middle point for a line having one word-space, no division being required for such a line. Another lever has its fulcrum at one-third of its length from the lower end, which divides the surplusage of the line by two for a line having two word-spaces, &c. The proper justifying-lever is brought into action by raising its connected interponent link 283. Beneath the several links are pins 287, Figs. 2 and 8, and beneath the pins is a slide 288, having rack-teeth in mesh with a pinion 289 on a short shaft 290, which is turned by the word-counting rack 218, Figs. 8, 11, and 12. The slide or rack 288 carries a spring having a cam projection 291, which raises the pins successively as the rack moves to the rear, and at the end of each line of impressions it stands under the pin corresponding to the number of word-spaces in the line, bringing the interponent link above said pin into the path of the cross-head 282. When the line-key is operated, the selected justifying-lever is rocked and its lower end moves a slide 292, Figs. 2 and 5. The said slide rocks a horizontal lever 293, which in turn rocks a vertical lever 294, Figs. 5 and 15, the upper end of which is connected by a link 295 to a slide 296, carrying on its left end a head or carrier 297, in which is mounted the movable justifying-knife. The knife-carrier 297 is provided with a guide-pin 298, sliding in an opening in the bracket. It will be evident that the movement of the knife-carrier 297 will be in proportion to the movement of the lower end of the operative justifying-lever.

Justification in this machine is accomplished by removing sections of the matrix-strip between the words, and this is accomplished by means of two knives 299 and 300, Figs. 14, 15, and 19. The knife 299 is mounted with freedom to slide in the adjustable carrier 297, and it will hereinafter be called the "adjustable" knife. The knife 300 is mounted with freedom to slide in a carrier 301. Means are provided for moving the knife 300 on its carrier. The knife 299 is simultaneously moved, being connected to the knife 300 by a pin 302, which slides in an opening at the base of knife 299, Fig. 14. The means for operating the justifying-knives will be described hereinafter, it being now in order to describe the devices for feeding the matrix-strip to the knives.

The starting key 303, Fig. 8, is connected to a lever 304, the rear end of which stands under a pin 305, projecting from a vertical slide 306. The upper end of the slide carries a bar 307 having a T-shaped head 308, Figs. 8 and 9. Adjacent to the head 308 is a shoulder 309 in the bracket, which is engaged by the pawl 266 to locate the matrix-carriage in its right-hand position, Fig. 9. When the starting-key is depressed, the pawl 266 is raised and the carriage released. Before the matrix-carriage is released and while the matrix-strip is passing into the carriage the clamp 273 is held in an elevated position by means of the engagement of its plunger 274 with a pinion on a shaft 310, which shaft is prevented from turning by engagement of an arm 311 with the vertical arm of an elbow-lever 312, Figs. 8, 10 and 12. When the starting-key is operated, the rod 307 strikes the horizontal arm of lever 312 and releases shaft 310, permitting spring 275 to draw the clamp 273 onto the strip. This takes place immediately before the matrix-carriage is released. The shaft 310 is rocked back and the clamp raised at the proper time by means of a cam 313 on line-shaft L, said cam operating through roll 314, lever 315, and link 316. The link 316 has a projection 317, which engages an arm 318 on shaft 310. The link 316 is also connected to an arm 319 on the dump-shaft 259, and as it raises the clamp 273 it simultaneously rocks the dump-shaft and discharges the matrix-strip down an incline into a channel 320, Figs. 8, 10, and 17.

By mechanism heretofore described the unjustified strip has been measured and the justifying-knife set in proper position to cut sections from the strip to justify it. The carrier for the justifying-knife is held in its adjusted position during the justification of a line. When the line-key is operated to start the justifying mechanism for a new line, the carrier is released and readjusted and immediately reclamped in its new position, these operations taking place before the matrix-strip is presented to the knives. This clamping of the adjustable knife-carrier is accomplished as follows: The lower end of the lever 294, Figs. 8 and 15, is located between the fixed block 321 and the clamping-lever 322. Lever 322 has an arm 323, which is normally drawn down by a pivoted hook 324, attached to a cam-lever 325, said lever being drawn against its cam 326 on the line-shaft by a spring 327. Connected to the lower end of plunger 306 is an elbow-lever 328, to which is pivotally connected a finger 329, supported on a spring 330, Fig. 8. When the starting-key 303 is depressed, slide 306 raises the finger 329 and throws the hook 324 off of clamping-lever 322, releasing the lever 294 and the adjustable knife-carrier. The line-shaft is simultaneously started, and as it revolves cam 326 raises pawl 324, which reëngages the clamping-lever, and as the cam passes from under its lever 325 spring 327 draws said lever down and applies the clamp.

It has been previously explained that the line-shaft is drawn into action by rocking the starting-shaft S. The starting-shaft is operated by means of an arm 331, having a cam-slot, in which plays a roller 332, connected to the weight 268, which operates the matrix-carriage, said weight being inclosed in the casing 333, having a straight slot 334, through which the roller projects, Figs. 4 and 17.

The unjustified matrix-strip is deposited by the dump-shaft in the channel 320 in front of a follower-head 335, connected to a follower-slide 336, which is normally drawn toward the left by means of a cord 337, Figs. 4, 8, 10, and 17. The cord 337 passes around an idle sheave 338 and is connected to sheave 339 on a short shaft 340 in line with the running-shaft 40. The shaft 340 has a second sheave 341, around which extends a cord 342, connected to a weight 343. Upon the sheave 339 is a pawl 344, which is drawn into engagement with the running-shaft 40 by a spring 345 with sufficient force to prevent slipping. The sheave 339 may be drawn backward at any speed in returning the follower-slide; but it is permitted to go forward only at the speed of the running-shaft by reason of the engagement of its pawl with said shaft. By these means the rate of forward movement of the follower-head is regulated. The follower-head is returned to its initial position by means of a cord 346 passing around a sheave 347 and connected to a sheave 348 at the right end of the machine, Figs. 3, 4, and 11. On the shaft of sheave 348 is a pinion 349, which is engaged by a rack 350. Said rack is driven forward at proper times by a projection 351 on the end of the line-shaft L. This projection is so shaped and located that it holds the follower in its initial position until the line-matrix is dumped in front of it, after which the follower is released and permitted to carry the matrix-strip to the justifying-knives.

Referring to Figs. 14, 18, and 19, 352 indicates the slide to which the non-adjustable knife 300 is attached. In the rear of said slide an interponent 353 is constantly reciprocated by an elbow-lever 354, having a roll 355 bearing upon a cam 356 on the running-shaft 40. Interponent 353 is connected to a lever 357 by link 358 and normally held, as shown in Fig. 18, so that the slide 352 is out of its path of movement. Lever 357 is centrally pivoted on one arm of a bell-crank 359, which has a roll 360 bearing on a cam on the running-shaft 40. The bell-crank 359 is held in engagement with its cam by means of a spring 361. So long as no obstruction is interposed in the path of the forward end of lever 357 the rear end of said lever and the interponent 353 are not raised. Above the forward end of lever 357 is a short lever 367, the lower end of which is normally held out of the path of lever 357 by means of a spring 368, Fig. 19. On the upper end of lever 367 is a pivoted pawl 369, the forward end of which is adapted to engage the notches which indicate the word-spaces in the matrix-strip $m$. The tail end of pawl 369 is struck periodically by the forward end of a lever 370, Figs. 18 and 19, which lever is operated in one direction by a spring 371 and in the opposite direction by a slide or bolt 372, which has a roll 373 resting on one of the cams of running-shaft 40. A pin 374 on said slide supports the rear end of lever 370.

As the matrix-strip $m$ is fed to the left by the follower-head its forward end first comes in contact with pawl 369. At this time the foward end of the pawl is in its lowest position, as indicated in dotted lines in Fig. 19, and the tail end is raised and in position to engage a fixed shoulder 375, which does not permit the pawl to be pushed back sufficiently to throw the lower end of lever 367 into the path of lever 357. The lever 370 now trips the pawl 369 and permits the matrix-strip to advance until the pawl drops into the notch which indicates the first word-space. The movement of the matrix-strip carries the pawl backward until its tail end is stopped at 376, the forward end of the pawl then being between the two justifying-knives and the lower end of lever 367 in the path of lever 357. During the next rotation of the running-shaft lever 357 engages lever 367, and its rear end raises the interponent 353 into alinement with the slide 352. The interponent is then driven forward, and the two justifying-knives cut a section from the strip. The strip passes through the knife-carriers, as indicated in Fig. 14, and said carriers form cutting-blocks. A spring-hook 377 engages the interponent and draws the knife-carriers back, permitting the matrix-strip to be fed forward. The above-recited operations are repeated for each word-space in the strip, and the strip is thus cut into as many sections as there are words. The assembled word-matrices form a justifying line-matrix from which a linotype-bar can be cast.

The knife-carrier 301 is pivoted at 400 and normally held in the position shown in full lines, Fig. 14, by a spring 401. The object of thus pivoting the knife-carrier is to prevent the pieces of matrix-strip which are to be removed from buckling and becoming jammed between the knives. The knives are beveled on their adjoining faces. As the knife 299 enters the matrix-strip it forces the piece to be cut out toward the knife 300. The bevel of the knife 300 tends to force said knife and its carrier still farther to the left, the result being that the parts 300 and 301 are moved into the position shown in dotted lines each time a piece is cut from the strip. The piece cut out is therefore loosely held between the knives and easily discharged therefrom.

*Matrix-assembling mechanism.*—At the left of the justifying-knives is a magazine 378, having a channel or compartment for empty matrix-line holders 379 and a second channel or compartment for the loaded holders, Figs. 15, 16, 18, and 19. The lowest one of the empty line-holders 379 normally stands in front of a plunger 380 and in line with the channels 381 in the knife-carriers through which the matrix-strip passes. The follower-head drives the justified line of matrix-words into the holder. As the justifying mechanism runs rapidly, being driven by the running-shaft 40, a line-matrix is justified more rapidly than the succeeding matrix can be formed by the impression devices. Upon touching the line-key the plunger 380 is driven forward, carrying the line-holder just loaded against a pair of beveled edges of a swaging-block 382, which edges spread the edges of the matrix material and firmly lock it in the holder, thus forming a portable line-matrix which is adapted to coöperate with a casting mechanism to cast linotype-bars. The plunger 380 is operated by means of links 383, cranks 384, rock-shaft 385, pinion 386, and vertical rack 387, said rack having a roll 388, which coöperates with a cam 389 on the line-shaft L, Figs. 4, 5, 14, 15, and 16.

Surrounding the swaging-block 382 is a stripper 390, which is pressed toward the line-holder by a spring 391. After the swaging-knives have been driven into the matrix material the plunger 380 retreats slightly and the filled block is pushed off of the swaging-knives by the stripper and into alinement with the filled holders in the magazine. An injecting-blade 392 then moves forward, raising the filled holder into the magazine and pushing the previously-filled holders to make room for it. The plunger 380 then retreats farther, and the stripper 390 moves back sufficiently to prevent the filled holders from falling. The plunger 380 then moves back to its rearmost position, and an empty holder 379 drops in front of it and in position to receive the word-matrices of the next line. The injecting-blade 392 is carried by two racks 393, which mesh with pinions 394 on a rock-shaft 395. Said rock-shaft is operated by a vertical rack 396, resting on the forward end of a bell-crank 397, which carries a roll 398, bearing on a cam 399 on the line-shaft L.

By using intaglio or matrices in place of the middle dies type-faces would be formed on the matrix-strip which might be used to subsequently produce a line-matrix. It will be understood that such a modification is within the scope of my invention. It will also be evident that in so far as the leading features of the present invention are concerned the particular construction and arrangement of mechanical devices herein illustrated and described are unimportant, as many equivalent structures will readily suggest themselves to the expert mechanic.

Without, therefore, limiting myself to the precise construction and arrangement herein set forth for the purpose of illustration, I claim—

1. A mechanism for justifying a line-matrix, comprising automatic means for eliminating portions of the matrix material between words sufficient to reduce the length of the matrix-strip to the desired measure.

2. A mechanism for justifying a line-matrix, comprising automatic means for cutting out portions of the matrix-strip between words, and means for assembling the word-matrices so formed in a justified line.

3. A mechanism for justifying a line-matrix, comprising means for measuring the unjustified strip, means for counting the word-spaces therein, and devices controlled by said means for eliminating portions of the word-spaces to reduce the line to the desired measure.

4. A mechanism for justifying a line-matrix, comprising a pair of knives, means for feeding the matrix-strip to said knives, justifying mechanism arranged to automatically adjust the knives, and means for operating the knives to cut sections from the strip between words, whereby said strip is reduced to form a justified line-matrix.

5. In a machine of the class described, the combination of means for forming word-groups of characters in a matrix-strip, with means for automatically justifying said strip by reducing the space between words.

6. In a machine of the class described, the combination with means for forming an unjustified line of characters in a matrix-strip with abnormal spaces between the words, of justifying means constructed and arranged to cut out from said spaces sufficient material to justify the line.

7. In a matrix-making machine, the combination with impression mechanism, and mechanism for feeding a matrix-strip thereto, of means for locating the ends of the unjustified strip at given distances from the first and last impressions in the line, and means for measuring and justifying the strip after the impressions are made therein.

8. In a matrix-making machine, the combination with the impression mechanism, and variable-feeding mechanism, of a unit-register, and means for operating said register comprising a knurled wheel arranged to be turned by the strip as it passes the impression-point.

9. In a composing-machine, a series of sets or groups of dies, combined with means for shifting any one of said groups into operative position, and independent means for bringing any die of the operative group to the impression-point.

10. In a composing-machine, a die-plate having a plurality of groups of dies, and a shift-key for rendering either group of dies operative, in combination with independent mechanism called into action by the keyboard for moving the operative group of dies to bring selected dies to the impression-point.

11. In a composing mechanism, the combination with a die-plate having mounted thereon a plurality of groups of dies, of two racks, a pinion interposed between said racks and mounted on a movable support, means for moving said racks and holding said support stationary to select the dies of a group and bring them to the impression-point, and means for moving said support and holding one of said racks stationary to bring any one of said groups into operative position at the impression-point.

12. In a matrix-making machine, the combination with impression mechanism, of means for variably feeding a matrix-strip thereto, comprising devices for gripping and releasing the strip, means for reciprocating said devices in the direction of the strip, and variable stops for said devices to limit the matrix feed.

13. In a matrix-making machine, the combination of intermittent-feeding mechanism for the strip, means for bringing said feeding mechanism into operation in response to the keys, and a variable-stop device for said feeding mechanism comprising a series of pins, and an interponent movable over said pins in response to the keys of the keyboard.

14. In a composing-machine, a variable-feed device comprising an irregular series of stops, a movable slide or part connected to the feeding device, an interponent between said parts and the stops, and means operated by the key-levers for locating said interponent in line with the stop corresponding to the selected character.

15. In a composing-machine, the combination with a series of groups of dies, and means for rendering any one of said groups operative, of a corresponding series of groups of stops, and means for rendering any group of stops operative when the corresponding group of dies is rendered operative.

16. In a matrix-making machine, the combination with an impression device, and means for feeding a line-matrix strip thereto, of a movable stop arranged to intercept the forward end of the strip in position to receive the first impression, and a knife arranged to cut off the unused portion of the strip at a given distance in the rear of the last impression.

17. In a justifying mechanism, the combination with a series of justifying-levers, of an interponent connected to each lever, a movable part adapted to engage and move any interponent which is rendered operative, and means for selecting and rendering operative one of said interponents for the justification of a line.

18. In a justifying apparatus, the combination with a measuring device, and a head 282 movable thereby, of a series of justifying-levers, interponents 283 connected with said levers and normally out of the path of said head, a word-space-counting device, and means controlled by said device for bringing any one of said interponents into the path of said movable head, for the purpose set forth.

19. In a matrix making and justifying machine, the combination with impression mechanism, and means for feeding a matrix-strip thereto, of justifying mechanism comprising devices for cutting sections from the strip, and a follower-head arranged to feed the strip to said devices.

20. In a matrix making and justifying machine, the combination with impression mechanism, and means for feeding the matrix-strip thereto, of a carriage for receiving the strip, a follower-head for moving the strip from the carriage to the justifying device, and means for discharging the strip in front of said follower-head.

21. In a matrix-making machine, the combination with the impression and feeding devices, of guides for receiving the strip from the impression devices, a follower-head, and means for rocking one of said guides to discharge the strip in front of the follower-head.

22. In a matrix-justifying mechanism, the combination with a non-adjustable knife-carrier and its knife, of an adjustable knife-carrier, a knife mounted on said latter carrier, means for adjusting said carrier, whereby the knife-edges are properly located for the justification of a strip, and means for feeding the matrix-strip to said knives intermittently.

23. In a justifying mechanism, the combination with justifying-knives, of a constantly-moving interponent which is normally out of engagement with said knives, and means for bringing said interponent into engagement with the knives, comprising a lever 357, a stop 367 for said lever, and means for throwing said stop into the path of said lever each time the matrix-strip presents a word-space to the knives.

24. A magazine for matrix-line holders, comprising a channel for the empty holders, and a second channel for the loaded holders, in combination with means for loading the holders successively and transferring them from the former channel to the latter.

25. The combination with means for justifying a matrix-strip, of a holder for said justifying-strip, and means for automatically loading the strip into the holders and swaging it securely therein.

26. The combination with a matrix-line holder, of a swaging-block having two swaging edges, means for driving the holder against said block to swage a line therein, and a stripper for removing the holder from the block.

27. The combination with the magazine having channels for empty and loaded matrix-line holders, of a slide for moving a holder from the empty channel to the loaded channel, and a second slide at right angles thereto for moving said holder into the loaded channel.

In testimony whereof I affix my signature in presence of two witnesses.

FRANK AMOS JOHNSON.

Witnesses:
 REBECCA W. HATHAWAY,
 WM. F. CASWELL.

---

Correction in Letters Patent No. 769,168.

It is hereby certified that the assignee in Letters Patent No. 769,168, granted September 6, 1904, upon the application of Frank Amos Johnson, of New Bedford, Mass., for an improvement in "Machines for Manufacturing Justified-Line Matrices," should have been described and specified as *The Unitype Company, of Manchester, Connecticut, a corporation of New Jersey*, instead of "The Unitype Company, of Manchester, Connecticut, a corporation of Connecticut;" and that the said Letters Patent should be read with this correction therein that the same may conform to the record of the case in the Patent Office.

Signed and sealed this 18th day of October, A. D., 1904.

[SEAL.]

E. B. MOORE,
*Acting Commissioner of Patents.*

26. The combination with a matrix-line holder, of a swaging-block having two swaging edges, means for driving the holder against said block to swage a line therein, and a stripper for removing the holder from the block.

27. The combination with the magazine having channels for empty and loaded matrix-line holders, of a slide for moving a holder from the empty channel to the loaded channel, and a second slide at right angles thereto for moving said holder into the loaded channel.

In testimony whereof I affix my signature in presence of two witnesses.

FRANK AMOS JOHNSON.

Witnesses:
REBECCA W. HATHAWAY,
WM. F. CASWELL.

---

Correction in Letters Patent No. 769,168.

It is hereby certified that the assignee in Letters Patent No. 769,168, granted September 6, 1904, upon the application of Frank Amos Johnson, of New Bedford, Mass., for an improvement in "Machines for Manufacturing Justified-Line Matrices," should have been described and specified as *The Unitype Company, of Manchester, Connecticut, a corporation of New Jersey*, instead of "The Unitype Company, of Manchester, Connecticut, a corporation of Connecticut;" and that the said Letters Patent should be read with this correction therein that the same may conform to the record of the case in the Patent Office.

Signed and sealed this 18th day of October, A. D., 1904.

[SEAL.]

E. B. MOORE,
*Acting Commissioner of Patents.*

It is hereby certified that the assignee in Letters Patent No. 769,168, granted September 6, 1904, upon the application of Frank Amos Johnson, of New Bedford, Mass., for an improvement in "Machines for Manufacturing Justified-Line Matrices," should have been described and specified as *The Unitype Company, of Manchester, Connecticut, a corporation of New Jersey*, instead of "The Unitype Company, of Manchester, Connecticut, a corporation of Connecticut;" and that the said Letters Patent should be read with this correction therein that the same may conform to the record of the case in the Patent Office.

Signed and sealed this 18th day of October, A. D., 1904.

[SEAL.]

E. B. MOORE,
*Acting Commissioner of Patents.*